Patented Apr. 4, 1944

2,345,754

UNITED STATES PATENT OFFICE 2,345,754

PROCESS FOR THE SYNTHESIS OF DRYING OILS FROM PETROLEUM HYDROCARBONS

Herman B. Kipper, Accord, Mass.

No Drawing. Application October 27, 1941, Serial No. 416,761

2 Claims. (Cl. 106—239)

In Patents Nos. 2,152,890, 2,171,851, 2,199,633, 2,224,603 2,228,356, and 2,236,796, issued to applicant, various processes are described for the production of unsaturated hydrocarbons and chlorinated unsaturated hydrocarbons from petroleum oils such as so-called "gas" and fuel oils. These oils subsequently are condensed with natural or artificial resins to give "drying oils." It is with improvements in the color and other properties of the oils fabricated, as described in these patents already issued and other patent applications now pending, that applicant's processing, subsequently described, deals.

In the first place, applicant may state that the dehydrogenated oils, unsaturated hydrocarbons or chlorinated unsaturated hydrocarbons, have been simply distilled under vacuum prior to condensation with resins for improvement of color. Thus a fuel oil of 0.87 specific gravity which had been acted on with twenty-four percent of oxygen for reduction of three percent hydrogen content was distilled under vacuum, the final distillation temperature being about two hundred ninety degrees centigrade.

In the second place, bleaching of the oils was carried out. Regular so-called "bleach powder," or calcium oxychloride, and a solution of sodium oxychloride were used for this purpose; also hydrogen peroxide and sodium chlorite, were employed. Bleaching of either the unsaturated hydrocarbons or of these condensed with resins may be carried out. From one to ten percent of so-called active chlorine on weight of oil were employed, dependent on the character of the oil used. Thus the oil produced by dehydrogenation with nitric acid required a far higher percentage of bleach than the oils produced by vapor phase oxidation and the oils synthesized by liquid phase oxidation required the least bleach.

As an example of the bleaching operation five hundred grams of an oil made by vapor phase selective oxidation and of about 0.89 specific gravity condensed with seven percent colophony resin, using either so-called "solid" phosphoric acid or "solid" hydrogen metal phosphates, or again metallic chlorides, as cadmium and ammonium chloride, as condensation agents or catalysts, were bleached by adding two hundred cubic centimeters of a bleach solution, containing about fifteen grams of active chlorine, under stirring and during about a half an hour period. About two hundred cubic centimeters of a twenty-five percent sodium chloride solution were then added, also under stirring. The reaction mass was then allowed to stand for about twenty-four hours in a separatory funnel and the aqueous solution drawn off and the oil finally dried with anhydrous calcium chloride or calcium sulphate and filtered off from the drying salt with the use of vacuum. Bleaching of the oils before condensation with resins was conducted similarly. Bleaching of the oils has not, however, been found to be very satisfactory. The initial improvement in color does not appear to be a permanent one.

A marked improvement in color of the oils produced from vapor phase oxidation was established by addition of a small percentage of diethylphosphate. From one-tenth to two percent were used. The latter compound was readily produced from triethylphosphate by freeing or saponifying from one of the ethyl radicals with aqueous caustic soda. Dimethyl, dipropyl, and dibutyl phosphates were made similarly and also diphenyl phosphate. All of these compounds, as also the monoethylphosphate, were found very useful for improvement in color of the oils fabricated, more especially those produced from vapor phase selective oxidation.

The diethyl—or other organic phosphate—was mixed with the unsaturated oils before condensation with resin or simply added to the finished drying oil. As an example, three grams of diethyl phosphate were mixed with five hundred grams of a vapor phase selectively oxidized oil. The oil was then condensed with fifty grams of colophony resin at about one hundred degrees centigrade with the use of "solid" hydrogen copper phosphate as catalyst. The deep red color of the vapor phase oxidized oil was thereby reduced to a light pinkish color in the finished fabricated oil.

In my patents noted in the first paragraph of this application, oils produced from petroleum hydrocarbons by oxidation with oxygen (air) and nitric acid were subsequently condensed with resins, both natural and artificial, and gums, as gum elemi, with the use of "solid" phosphoric acid and "solid" hydrogen metal phosphates and metal chlorides as catalysts. With the resins and gums, vegetable oils were also used. Applicant had considered such admixture rather as merely a true mixture, but he now has proven by a number of comparative drying tests that such is not the case and that polymerization or partial condensation of the drying oils themselves occurs with the unsaturated petroleum hydrocarbons or resins, or in other words new compounds are formed, to give finished drying oils of higher drying speed than that possessed by the original mixture.

As an example of the procedure of fabrication, five hundred grams of a 0.87 specific gravity petroleum hydrocarbon which had been selectively oxidized with about twenty-four percent of oxygen for three percent of hydrogen removal was condensed with fifty grams of colophony resin at about one hundred and fifteen degrees centigrade, using twenty-five grams of a powdered "solid" copper hydrogen phosphate catalyst during a half hour period under thorough stirring. Twenty-five grams of tung oil and twenty-five grams of soya bean oil were then added and condensation continued for another half hour. The oil was then filtered off with the use of vacuum from the catalyst. The synthesized oil showed a speed of drying in atmospherically exposed pigmented films better than that of tung oil.

Other "solid" metal hydrogen phosphates, as those of zinc, iron and lead, as well as "solid" phosphoric acid itself, have been used as catalysts in these condensations. Also cadmium chloride in conjunction with ammonium chloride has been found a very excellent catalyst. Other metal chlorides used were those of sodium, potassium, calcium and magnesium. Manganous, cobaltus and nickelous chlorides were also satisfactorily used. The alkali and alkali earth chlorides were used only in conjunction with other metal chlorides, as when used alone their catalytic power did not appear to be very good. Of course, many metal chlorides are, so-to-speak, too active, such as the chlorides of aluminum, tin, antimony, etc. Cuprous chloride was found fairly satisfactory, especially if used in conjunction with ammonium chloride. Cupric chloride, on the other hand, causes darkening of the oil.

Castor oil and linseed oil were used similarly to tung and soya bean oils, but the latter oil appeared possibly the most effective towards establishing enhanced viscosity and curiously also enhanced drying power. Soya bean oil itself is a rather slow drying oil.

Synthetic formaldehyde-phenolic and other synthetic oil soluble resins were used in this condensation work with unsaturated petroleum hydrocarbons from the beginning of applicant's condensation work, but colors of the finished pigmented surfaces, that is when using pure white pigments, were not as good as with the natural resins.

Metal bromides may be used in place of the chlorides satisfactorily, as established by the use of cadmium and cuprous bromides, both of which were found good catalysts when used in conjunction with ammonium bromide. Metal iodides were tried but darkening of the oils took place.

Copal and damar were other natural resins employed and because of the fact that chlorinated unsaturated hydrocarbons, produced from petroleum oils and condensed with both natural and synthetic resins, showed rather better weathering properties, such chlorinated, unsaturated hydrocarbons were also employed by applicant in his synthetic drying oil experimentation.

In his condensation work with resins, temperatures of fifty to one hundred and thirty degrees centigrade generally were employed, but even lower or higher temperatures naturally might be used. Furthermore, combinations of artificial and natural resins and vegetable oils used for condensation with unsaturated hydrocarbons, might be expanded ad infinitum. The scope of applicant's work should equitably pertain to cover such possible expansions. Finally, as noted, in place of "solid" phosphoric acid and its metal salts, metal chlorides may be used as catalysts.

I claim:

1. In a process for improving the color, by establishing a color more nearly resembling that of the vegetable drying oils, of petroleum oils, dehydrogenated to effect unsaturation and such unsaturated oils condensed with oil soluble resins to give synthetic drying oils, the step of treatment of the said oils with a small percentage of an hydrocarbon hydrogen phosphate.

2. In a process for improving the color, by establishing a color more nearly resembling that of the vegetable drying oils, of petroleum oils, dehydrogenated to effect unsaturation, and such unsaturated oils condensed with oil soluble resins to give synthetic drying oils, the step of treatment of the said oils with a small percentage of diethyl phosphate.

HERMAN B. KIPPER.